(12) United States Patent
Hungerland et al.

(10) Patent No.: US 11,345,812 B2
(45) Date of Patent: May 31, 2022

(54) STABILIZED, FILLED POLYCARBONATE COMPOSITIONS

(71) Applicant: Covestro Deutschland AG, Leverkusen (DE)

(72) Inventors: Tim Hungerland, Cologne (DE); Tanja Cassel, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 24 days.

(21) Appl. No.: 16/956,699

(22) PCT Filed: Dec. 12, 2018

(86) PCT No.: PCT/EP2018/084543
§ 371 (c)(1),
(2) Date: Jun. 22, 2020

(87) PCT Pub. No.: WO2019/121229
PCT Pub. Date: Jun. 27, 2019

(65) Prior Publication Data
US 2020/0332114 A1 Oct. 22, 2020

(30) Foreign Application Priority Data

Dec. 20, 2017 (EP) .................................. 17208724

(51) Int. Cl.
*C08L 69/00* (2006.01)
*C08K 3/36* (2006.01)
*C08K 3/22* (2006.01)

(52) U.S. Cl.
CPC ...... *C08L 69/00* (2013.01); *C08K 2003/2227* (2013.01); *C08K 2003/2241* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 2,991,273 A | 7/1961 | Wilhelm et al. | |
| 2,999,835 A | 9/1961 | Goldberg | |
| 2,999,846 A | 9/1961 | Hermann et al. | |
| 3,148,172 A | 9/1964 | Fox | |
| 3,271,367 A | 9/1966 | Hermann et al. | |
| 3,360,498 A * | 12/1967 | Rawlings ............... | C08L 69/00 523/209 |
| 4,049,614 A * | 9/1977 | Baron ....................... | C08K 3/36 524/493 |
| 4,982,014 A | 1/1991 | Freitag et al. | |
| 5,097,002 A | 3/1992 | Sakashita et al. | |
| 5,340,905 A | 8/1994 | Kuehling et al. | |
| 5,717,057 A | 2/1998 | Sakashita et al. | |
| 2004/0180980 A1 * | 9/2004 | Petter ...................... | C08L 77/00 522/2 |
| 2006/0287422 A1 | 12/2006 | Volkers et al. | |
| 2012/0022204 A1 * | 1/2012 | Wehrmann ............. | C08L 69/00 524/508 |

FOREIGN PATENT DOCUMENTS

| | | | |
|---|---|---|---|
| CN | 107163447 | * | 9/2017 |
| DE | 1570703 | A1 | 2/1970 |
| DE | 2036052 | A1 | 1/1972 |
| DE | 2063050 | A1 | 7/1972 |
| DE | 3832396 | A1 | 2/1990 |
| DE | 10006208 | A1 | 8/2001 |
| DE | 10022037 | A1 | 11/2001 |
| DE | 102005058847 | A1 | 6/2007 |
| EP | 0332454 | A2 | 9/1989 |
| EP | 0500496 | A1 | 8/1992 |
| EP | 0839623 | A1 | 5/1998 |
| EP | 1559743 | A1 | 8/2005 |
| EP | 1865027 | A1 | 12/2007 |
| FR | 1561518 | A | 3/1969 |
| GB | 1122003 | A | 7/1968 |
| GB | 1341318 | A | 12/1973 |
| JP | 63221155 | * | 9/1988 |
| WO | 96/15102 | A2 | 5/1996 |
| WO | 01/05866 | A1 | 1/2001 |
| WO | 2004/063249 | A1 | 7/2004 |
| WO | 2010/108626 | A1 | 9/2010 |
| WO | 2011/038842 | A1 | 4/2011 |
| WO | 2013/060687 | A1 | 5/2013 |
| WO | 2015/052106 | A2 | 4/2015 |
| WO | 2016/087477 | A1 | 6/2016 |

OTHER PUBLICATIONS

International Preliminary Report on Patentability received for PCT Patent Application No. PCT/EP2018/084543, dated Jul. 2, 2020, 12 pages (7 pages of English Translation and 5 pages of Original Document).

International Search Report and Written Opinion received for PCT Patent Application No. PCT/EP2018/084543, dated Feb. 28, 2019, 14 pages (6 pages of English Translation and 8 pages of Original Document).

* cited by examiner

*Primary Examiner* — David J Buttner

(74) *Attorney, Agent, or Firm* — Faegre Drinker Biddle & Reath LLP

(57) ABSTRACT

The invention relates to the use of PMMI copolymers for reducing the molecular weight degradation of the polymer induced by oxides such as titanium dioxide or silicon dioxide in compositions based on aromatic polycarbonate. The mechanical, optical and rheological properties of the thermoplastic composition remain good and are in some cases even improved despite the addition of the PMMI copolymer.

14 Claims, No Drawings

STABILIZED, FILLED POLYCARBONATE COMPOSITIONS

CROSS-REFERENCE TO RELATED APPLICATIONS

This application is a national stage application (under 35 U.S.C. § 371) of PCT/EP2018/084543, filed Dec. 12, 2018, which claims benefit of European Application No. 17208724.9, filed Dec. 20, 2017, both of which are incorporated herein by reference in their entirety.

The present invention relates to the stabilization of aromatic polycarbonate in polycarbonate compositions filled with oxides of metals or metalloids of the 3rd or 4th main group or 4th transition group against molecular weight degradation while having the smallest possible effect on mechanical properties, in particular heat resistance, and accordingly to the use of a novel additive for this purpose and to corresponding compositions containing aromatic polycarbonate and at least one oxide of a metal or metalloid of the 3rd or 4th main group or 4th transition group and therefore also to a process for avoiding/reducing polycarbonate degradation by addition of such oxides. The invention also relates to mouldings made from these compositions.

The production of filled polycarbonate compositions by compounding results, depending on the filler, in molecular weight degradation of the polycarbonate under the process conditions customary for the material. Fillers, particularly those bearing reactive groups at the surface, may undergo chemical reaction with the polycarbonate. These reactions can result in chain scission and thus in molecular weight degradation. This problem is described inter alia in US 2006/0287422 A1.

Molecular weight degradation in turn has an adverse effect on the optical, rheological, mechanical and thermal properties of the polycarbonate compositions. It is therefore necessary to add to the compositions process stabilizers which inhibit the degradation of the polymer chains, i.e. the molecular weight degradation.

There are by now extensively researched additives, usually based on the antioxidant effect of organophosphorus compounds, for stabilizing polycarbonate. Thus for example WO 2011/038842 A1 describes that addition of phosphates in small amounts can improve the melt stability and thus the molecular weight degradation during processing of polycarbonate compositions. The associated yellowing and thus the deterioration in optical properties is likewise minimized. DE 102009043513 A1 describes combinations of different organophosphorus compounds for improving the optical properties of polycarbonate compositions. However, since the principle of operation is based on redox processes effective stabilization of filler-based polycarbonate compounds cannot be realized therewith.

From a modern perspective there are two types of additives which may counter this type of polymer degradation—inorganic acids, for instance described in WO 2013/060687 A1, for example phosphoric acid or phosphorous acid. Also in existence are organic acids (usually carboxylic acids), such as for example citric acid or acid-functionalized olefinic (co)polymers, for instance described in DE 102005058847 A1. However, the use of such systems in polycarbonate compositions is associated with disadvantages. If added in excessive amounts the high acidity of the inorganic acids can itself result in cleavage of the carbonate units and thus in degradation. Organic acids usually already decompose far below the typical processing temperature of polycarbonate (260-400° C.). Thus, citric acid decomposes from 175° C. for example. However, on account of their comparably low viscosity above a certain critical concentration classical polymers or oligomeric systems based on olefinic base structures bearing carboxylic acid or carboxylic anhydride functionalities result in plasticization of the polycarbonate and thus in partial loss of mechanical and thermal properties.

It is desirable for the abovementioned reasons to find an additive which does not decompose under the processing conditions of polycarbonate, does not negatively impair the mechanical and thermal properties of polycarbonate and also has a sufficient stabilizing action, ideally even in low concentrations.

Conventional process stabilizers such as phosphites or phosphonites have been found to be unsuitable for inhibiting filler-induced degradation. In filled thermoplastics, use is made, inter alia, of oxidized acid-modified polyolefinic (co)polymers, for example HiWax from Mitsui Chemicals, or A-C products from Honeywell. WO 2016/087477 A1 describes the use of oxidized polyethylene waxes in polycarbonate and the effect thereof on heat resistance among other properties. Even small amounts of these additives can negatively affect thermal and mechanical properties owing to their low melting points. Depending on the filler content, stabilization of filled polycarbonate compositions requires wax concentrations>1% by weight. At higher concentrations, however, such additives have a plasticizing effect and hence reduce the reinforcing effect of the filler and hence its primary purpose. In addition, the miscibility of these olefinic waxes with polycarbonate decreases rapidly with increasing content, thus leading to significant clouding of the compounds. Moreover, in the case of addition of fillers, this also has an adverse effect on colourability and leads to delamination effects at the surface of the materials. Furthermore, such waxes are unstable under prolonged thermal stress, which leads to more rapid yellowing of the material.

The problem addressed was therefore that of identifying suitable novel stabilizers which inhibit molecular weight degradation in aromatic polycarbonate in metal/metalloid oxide-filled polycarbonate compositions without having a negative effect on the actual reinforcing effect of the filler and that of providing corresponding compositions. There should be very little, if any, negative effect on the thermal, mechanical, optical and rheological properties of the polycarbonate compositions compared to compositions lacking the novel stabilizer.

Surprisingly, this problem is solved by addition of PMMI copolymer to the polycarbonate compositions. Addition of the PMMI copolymer does not significantly impair the heat resistance and the mechanical and rheological properties of the polycarbonate compositions, but in some cases actually improves them.

The invention thus provides for the use of PMMI copolymers for inhibiting, i.e. at least reducing, preferably avoiding, the molecular weight degradation of aromatic polycarbonate in polycarbonate compositions filled with at least one oxide of a metal or metalloid of the 3rd or 4th main group or 4th transition group during compounding, in particular also during compounding using a co-kneader. Co-kneaders typically have comparatively high residence times and good stabilization is therefore of particular importance here.

Compounding is the admixing of added substances, especially of fillers and additives, to the polymer, here to the aromatic polycarbonate. This is typically accomplished by means of an extruder and at temperatures in the extruder above 260° C.

The invention therefore also provides a composition containing

A) aromatic polycarbonate,
B) at least one oxide of a metal or metalloid of the 3rd or 4th main group or 4th transition group, in particular titanium dioxide, silicon dioxide and/or aluminium oxide,
C) PMMI copolymer and
D) optionally further additives.

The term "at least one oxide of a metal or metalloid of the 3rd or 4th main group or 4th transition group" is synonymous with the term "one or more oxides of a metal or metalloid of the 3rd main group, 4th main group and/or 4th transition group".

The individual components are described in detail hereinafter.

Component A

Component A of the composition is selected from aromatic polycarbonates.

Aromatic polycarbonates in the context of the present invention include not only homopolycarbonates but also copolycarbonates and/or polyestercarbonates; the polycarbonates may be linear or branched in a known manner. According to the invention, mixtures of polycarbonates may also be used.

The thermoplastic polycarbonates, including the thermoplastic aromatic polyestercarbonates, preferably have weight-average molecular weights $M_w$ of 15 000 to 40 000 g/mol, more preferably to 34 000 g/mol, particularly preferably of 17 000 to 33 000 g/mol, in particular of 19 000 to 32 000 g/mol, determined by gel permeation chromatography, calibrated against bisphenol A polycarbonate standards using dichloromethane as eluent, calibration with linear polycarbonates (formed from bisphenol A and phosgene) of known molar mass distribution from PSS Polymer Standards Service GmbH, Germany, and calibration by method 2301-0257502-09D (2009 German-language edition) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Use of UV and/or RI detection.

A portion, up to 80 mol %, preferably from 20 mol % to 50 mol %, of the carbonate groups in the polycarbonates used in accordance with the invention may have been replaced by aromatic dicarboxylic ester groups. Such polycarbonates, which contain both acid radicals of carbonic acid and acid radicals of aromatic dicarboxylic acids incorporated into the molecular chain, are referred to as aromatic polyestercarbonates. For the purposes of the present invention, they are covered by the umbrella term "thermoplastic aromatic polycarbonates".

The polycarbonates are produced in a known manner from dihydroxyaryl compounds, carbonic acid derivatives, optionally chain terminators and optionally branching agents, and the polyestercarbonates are produced by replacing a portion of the carbonic acid derivatives with aromatic dicarboxylic acids or derivatives of the dicarboxylic acids, and specifically according to the extent to which carbonate structural units in the aromatic polycarbonates are to be replaced by aromatic dicarboxylic ester structural units.

Dihydroxyaryl compounds suitable for the production of polycarbonates are those of formula (1)

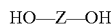  (1), in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

It is preferable when Z in formula (1) represents a radical of formula (2)

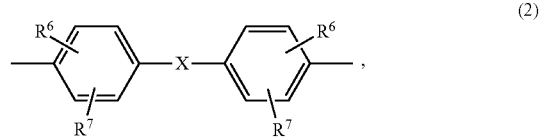

in which $R^6$ and $R^7$ independently of one another represent H, $C_1$- to $C_{18}$-alkyl-, $C_1$- to $C_{18}$-alkoxy, halogen such as Cl or Br or in each case optionally substituted aryl or aralkyl, preferably H or $C_1$- to $C_{12}$-alkyl, particularly preferably H or $C_1$- to $C_8$-alkyl and very particularly preferably H or methyl, and X represents a single bond, —SO$_2$—, —CO—, —O—, —S—, $C_1$- to $C_6$-alkylene, $C_2$- to $C_5$-alkylidene or $C_5$- to $C_6$-cycloalkylidene which may be substituted by $C_1$- to $C_6$-alkyl, preferably methyl or ethyl, or else represents $C_6$- to $C_{12}$-arylene which may optionally be fused to further aromatic rings containing heteroatoms.

It is preferable when X represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$— or a radical of formula (3)

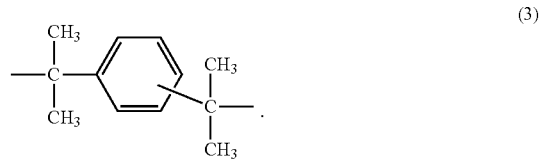

Examples of dihydroxyaryl compounds (diphenols) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis(hydroxyphenyl) sulfones, bis(hydroxyphenyl) sulfoxides, 1,1'-bis(hydroxyphenyl)diisopropylbenzenes and the ring-alkylated and ring-halogenated compounds thereof.

Dihydroxyaryl compounds suitable for the production of the polycarbonates and copolycarbonates for use in accordance with the invention are for example hydroquinone, resorcinol, dihydroxydiphenyl, bis(hydroxyphenyl)alkanes, bis(hydroxyphenyl)cycloalkanes, bis(hydroxyphenyl)sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes and the alkylated, ring-alkylated and ring-halogenated compounds thereof. Copolycarbonates may also be produced using Si-containing telechelics to obtain so-called Si-copolycarbonates.

Preferred dihydroxyaryl compounds are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane, 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (bisphenol TMC), and also the bisphenols of the formulae (I) to (III)

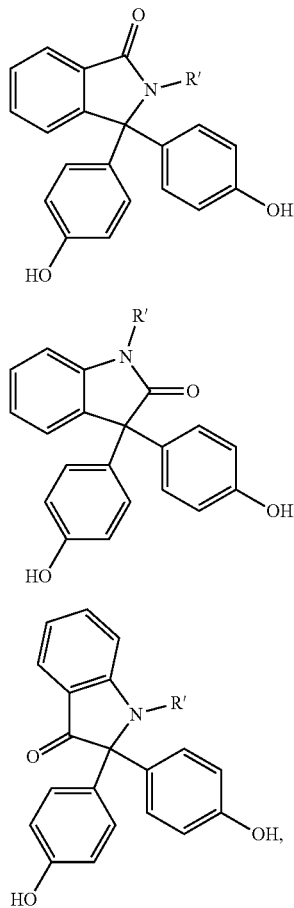

in which R' in each case represents a $C_1$- to $C_4$-alkyl radical, aralkyl radical or aryl radical, preferably a methyl radical or phenyl radical, most preferably a methyl radical.

Particularly preferred dihydroxyaryl compounds are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane (bisphenol TMC), and also the dihydroxyaryl compounds of formulae (I), (II) and/or (III).

These and further suitable dihydroxyaryl compounds are described for example in U.S. Pat. Nos. 2,999,835 A, 3,148,172 A, 2,991,273 A, 3,271,367 A, 4,982,014 A and 2,999,846 A, in German laid-open specifications 1,570,703 A, 2,063,050 A, 2,036,052 A, 2,211,956 A and 3,832,396 A1, in the French patent specification 1 561 518 A1, in the monograph by H. Schnell, "Chemistry and Physics of Polycarbonates", Interscience Publishers, New York 1964, pp. 28ff and pp. 102ff., and in D. G. Legrand, J. T. Bendler, "Handbook of Polycarbonate Science and Technology", Marcel Dekker New York 2000, pp. 72ff.

In the case of the homopolycarbonates, only one dihydroxyaryl compound is used; in the case of copolycarbonates, two or more dihydroxyaryl compounds are used.

Particularly preferred polycarbonates are the homopolycarbonate based on bisphenol A, the homopolycarbonate based on 1,1-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane or the two monomers bisphenol A and 4,4'-dihydroxydiphenyl and homo- or copolycarbonates derived from dihydroxyaryl compounds of formulae (I), (II) and/or (III)

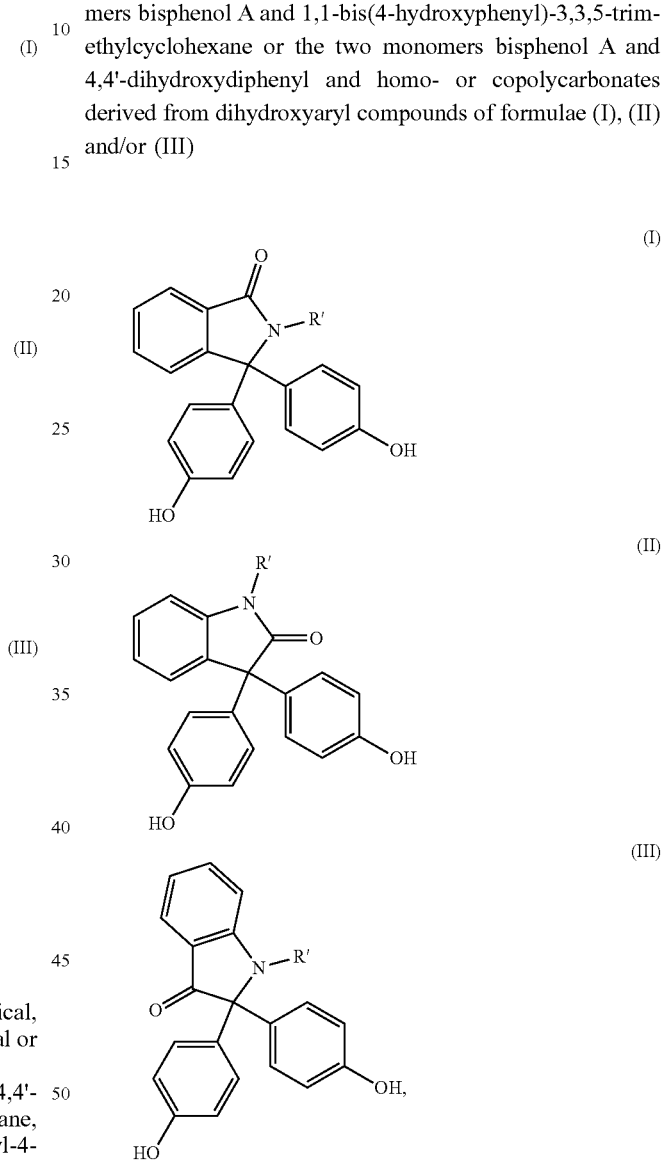

in which R' in each case represents $C_1$- to $C_4$-alkyl, aralkyl or aryl, preferably methyl or phenyl, very particularly preferably methyl, particularly bisphenol A.

The dihydroxyaryl compounds used, like all the other chemicals and auxiliaries added to the synthesis, may be contaminated with the impurities originating from their own synthesis, handling and storage. However, it is desirable to use raw materials of the highest possible purity.

Preference is also given to copolycarbonates having one or more monomer units of a siloxane of general formula (IV)

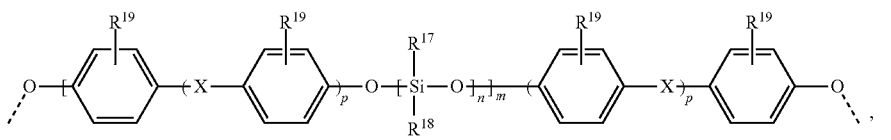

(IV)

in which $R^{19}$ represents hydrogen, Cl, Br or a $C_1$- to $C_4$-alkyl radical, preferably hydrogen or a methyl radical, particularly preferably hydrogen, $R^{17}$ and $R^{18}$ are identical or different and independently of one another represent an aryl radical, a $C_1$- to $C_{10}$-alkyl radical or a $C_1$- to $C_{10}$-alkylaryl radical, preferably in each case a methyl radical, and wherein X is a single bond, —CO—, —O—, a $C_1$- to $C_6$-alkylene radical, a $C_2$- to $C_5$-alkylidene radical, a $C_5$- to $C_{12}$-cycloalkylidene radical or a $C_6$- to $C_{12}$-arylene radical which may optionally be condensed with further aromatic rings containing heteroatoms, wherein X is preferably a single bond, a $C_1$- to $C_5$-alkylene radical, a $C_2$- to $C_5$-alkylidene radical, a $C_5$- to $C_{12}$-cycloalkylidene radical, —O— or —CO—, more preferably a single bond, an isopropylidene radical, a $C_5$- to $C_{12}$-cycloalkylidene radical or —O—, very particularly preferably an isopropylidene radical, n is a number from 1 to 500, preferably from 10 to 400, particularly preferably from 10 to 100, very particularly preferably from 20 to 60, m is a number from 1 to 10, preferably from 1 to 6, particularly preferably from 2 to 5, p is 0 or 1, preferably 1, and the value of n multiplied by m is preferably between 12 and 400, more preferably between 15 and 200, wherein the siloxane is preferably reacted with a polycarbonate in the presence of an organic or inorganic salt of a weak acid having a $pK_A$ of 3 to 7 (25° C.).

Copolycarbonates having monomer units of formula (IV) and in particular also the production thereof are described in WO 2015/052106 A2.

The total proportion of the monomer units based on the formulae (I), (II), (III), 4,4'-dihydroxydiphenyl and/or bisphenol TMC in the copolycarbonate is preferably 0.1-88 mol %, particularly preferably 1-86 mol %, very particularly preferably 5-84 mol % and in particular 10-82 mol % (based on the sum of the moles of dihydroxyaryl compounds used).

The copolycarbonates may be in the form of block copolycarbonate and random copolycarbonate. Random copolycarbonates are particularly preferred.

The ratio of the frequency of the diphenoxide monomer units in the copolycarbonate is derived here from the molar ratio of the dihydroxyaryl compounds used.

The relative solution viscosity of the copolycarbonates determined according to ISO 1628-4:1999 is preferably in the range of 1.15-1.35.

The monofunctional chain terminators needed to regulate the molecular weight, such as phenols or alkylphenols, especially phenol, p-tert-butylphenol, isooctylphenol, cumylphenol, the chlorocarbonic esters thereof or acid chlorides of monocarboxylic acids or mixtures of these chain terminators, are either supplied to the reaction together with the bisphenoxide(s) or else added to the synthesis at any time, provided that phosgene or chlorocarbonic acid end groups are still present in the reaction mixture, or, in the case of the acid chlorides and chlorocarbonic esters as chain terminators, provided that sufficient phenolic end groups of the incipient polymer are available. However, it is preferable when the chain terminator(s) is/are added after the phosgenation at a location or at a juncture at which phosgene is no longer present but the catalyst has not yet been added or when they are added before the catalyst or together or in parallel with the catalyst.

Any branching agents or branching agent mixtures to be used are added to the synthesis in the same manner, but typically before the chain terminators. Compounds typically used are trisphenols, quaterphenols or acyl chlorides of tri- or tetracarboxylic acids, or else mixtures of the polyphenols or of the acyl chlorides.

Some of the compounds having three or more than three phenolic hydroxyl groups that are usable as branching agents are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of branching agents for optional use is from 0.05 mol % to 2 mol %, in turn based on moles of diphenols used in each case.

The branching agents can either be initially charged with the diphenols and the chain terminators in the aqueous alkaline phase or added dissolved in an organic solvent before the phosgenation.

All of these measures for producing polycarbonates are familiar to those skilled in the art.

Aromatic dicarboxylic acids suitable for the production of the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of dicarboxylic acids include dicarbonyl dihalides and dialkyl dicarboxylates, in particular dicarbonyl dichlorides and dimethyl dicarboxylates.

Replacement of the carbonate groups by the aromatic dicarboxylic ester groups proceeds essentially stoichiometrically and also quantitatively and the molar ratio of the reaction partners is therefore also reflected in the final polyestercarbonate. The aromatic dicarboxylic ester groups can be incorporated either randomly or blockwise.

Preferred modes of production of the polycarbonates to be used according to the invention, including the polyestercarbonates, are the known interfacial process and the known melt transesterification process (cf. e.g. WO 2004/063249 A1, WO 2001/05866 A1, U.S. Pat. Nos. 5,340,905 A, 5,097,002 A, 5,717,057 A).

In the former case the acid derivatives used are preferably phosgene and optionally dicarbonyl dichlorides; in the latter case preferably diphenyl carbonate and optionally dicarboxylic diesters. Catalysts, solvents, workup, reaction conditions etc. for polycarbonate production/polyestercarbonate production are in both cases sufficiently described and known.

Compositions in the context of the invention are preferably "polycarbonate compositions" or "polycarbonate-based compositions". These are those compositions wherein the base material, i.e. predominant component present, is a polycarbonate. "Predominant" is here to be understood as meaning at least 55% by weight, preferably at least 60% by weight, more preferably at least 68% by weight, yet more preferably at least 70% by weight, particularly preferably at least 74% by weight, of aromatic polycarbonate based on the overall composition.

Component B

According to the invention the compositions contain as component B at least one oxide of a metal or metalloid of the 3rd or 4th main group or 4th transition group. The oxides of a metal or metalloid of the 3rd or 4th main group or 4th transition group may be employed alone or in admixture. Preferably employed are titanium dioxide, silicon dioxide and/or silicon dioxide-based components, such as glass fibres, and/or aluminium oxide, particularly preferably titanium dioxide and/or silicon dioxide, very particularly preferably titanium dioxide, in particular without further oxides of a metal or metalloid of the 3rd or 4th main group or 4th transition group, with the exception of titanium dioxide and/or silicon dioxide coatings.

Component B is present in the compositions according to the invention in an amount of preferably 5% to 44% by weight, more preferably from 5% to 40% by weight, yet more preferably from 8% to 32% by weight, particularly preferably from 10% to 30% by weight, very particularly preferably in an amount of 15% to 25% by weight, in each case based on the total composition.

The silicon dioxide is preferably naturally occurring or synthetically produced quartz or fused quartz.

The quartzes used in compositions according to the invention preferably have a spherical and/or approximately spherical grain shape. Approximately spherical is to be understood as meaning the following: When the sphere is described by equal-length axes proceeding from a common origin and oriented into space, wherein the axes define the radius of the sphere in all spatial directions, the spherical particles may have a deviation in the axis lengths from the ideal state for the sphere of up to 20% in order still to qualify as approximately spherical.

The quartzes are preferably characterized by a median diameter $d_{50}$ determined according to ISO 13320:2009 of 2 to 10 µm, more preferably of 2.5 to 8.0 µm, and yet more preferably of 3 to 5 µm, wherein a maximum diameter $d_{95}$, determined according to ISO 13320:2009, of 6 to 34 µm, more preferably of 6.5 to 25.0 µm, yet more preferably of 7 to 15 µm and particularly preferably of 10 µm is preferred.

The quartzes preferably have a specific BET surface area determined by nitrogen adsorption according to ISO 9277:2010 of 0.4 to 8.0 m$^2$/g, more preferably of 2 to 6 m$^2$/g and particularly preferably of 4.4 to 5.0 m$^2$/g.

More preferred quartzes only comprise not more than 3% by weight of secondary constituents, wherein preferably the content of
$Al_2O_3$ is <2.0% by weight,
$Fe_2O_3$ is <0.05% by weight,
$(CaO+MgO)$ is <0.1% by weight and
$(Na_2O+K_2O)$ is <0.1% by weight in each case based on the total weight of the quartz/silicate.

It is preferable to employ quartzes having a pH determined according to ISO 10390:2005 in aqueous suspension in the range 6 to 9, more preferably 6.5 to 8.0.

Said quartzes preferably have an oil absorption number according to DIN EN ISO 787-5:1995-10 of preferably 20 to 30 g/100 g.

In a preferred embodiment component B is finely divided quartz flours produced by iron-free milling with subsequent air sifting from worked-up quartz sand.

It is particularly preferable to employ fused silica, i.e. fused quartz, as component B, which is molten and resolidified silicon dioxide.

Quartzes or quartz glasses having a size on their surface may be employed, preference being given to employing epoxy-modified, polyurethane-modified and unmodified silane compounds, methylsiloxane and methacryloylsilane sizes or mixtures of the abovementioned silane compounds. Particular preference is given to an epoxysilane size. The sizing of silicon dioxide is effected by the general methods known to those skilled in the art.

However, it is preferable when the silicon dioxide employed for the compositions according to the invention is unsized.

Suitable titanium dioxides are preferably those produced by the chloride process, hydrophobized, specially after treated and suitable for use in polycarbonate, for example the commercially available product Kronos 2230 (Kronos Titan).

Possible surface modifications of titanium dioxide include inorganic and organic modifications. These include for example aluminium- or polysiloxane-based surface modifications. An inorganic coating may contain 0% to 5% by weight of silicon dioxide and/or aluminium oxide. An organic-based modification may contain 0% to 3% by weight of a hydrophobic wetting agent.

The titanium dioxide preferably has an oil absorption number determined according to DIN EN ISO 787-5:1995-10, of 12 to 18 g/100 g of titanium dioxide, more preferably of 13 to 17 g/100 g of titanium dioxide, particularly preferably of 13.5 to 15.5 g/100 g of titanium dioxide.

Particular preference is given to titanium dioxide having the standard designation $R^2$ according to DIN EN ISO 591, part 1, which is stabilized with aluminium and/or silicon compounds and has a titanium dioxide content of at least 96.0% by weight. Such titanium dioxides are available under the brand names Kronos® 2233 and Kronos® 2230.

When aluminium oxide is employed as component B this preferably has a pH of 7.0 to 7.4 measured according to ISO 10390:2005 in aqueous suspension. It is preferably unsized.

The specified amounts for component B in each case relate to the total weight of the employed oxide, including any size/surface modification.

Component C

Component C is selected from PMMI copolymers. These are thermoplastics that are partly imidated methacrylic polymers. PMMI copolymers are in particular obtained by reaction of PMMA with methylamine in a dispersion or in a melt in a reactor. A suitable process is described, for example, in DE 1 077 872 A1. Imide structures are produced along the polymer chain, with formation, depending on the degree of reaction, also of methacrylic anhydride and free methacrylic acid functionalities. The proportion of imide functionalities in the copolymer determines the heat resistance thereof. The degree of reaction is specifically adjustable.

PMMI copolymers have methyl methacrylate (MMA, 4a), methylmethacrylimide (MMI, 6), methylmethacrylic acid (MMS, 4b) and methylmethacrylic anhydride units (MMAH, 5). Preferably at least 90% by weight, more preferably at least 95% by weight, of the PMMI copolymer, based on the total weight of the PMMI copolymer, is selected from MMA, MMI, MMS and MMAH units. It is particularly preferable when the PMMI copolymers consist of these units.

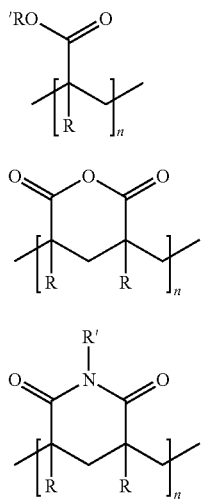

MMA: 4a (R = R' = $CH_3$), MMS: 4b (R = $CH_3$, R' = H), MMAH: 5 (R = $CH_3$), MMI: 6 ((R = R' = $CH_3$).

The units and their proportions in the PMMI copolymer can in particular be determined by means of quantitative $^1$H NMR spectroscopy on the basis of unambiguous chemical shift of the R' signals. The signals of the acid and anhydride monomer units cannot be assigned unambiguously and a collective consideration of these units is therefore advisable.

The PMMI copolymer preferably has an MMI proportion of at least 30% by weight, preferably of at least 35% by weight, more preferably of 35% to 96% by weight, particularly preferably of 36% to 95% by weight, of MMI, based on the total weight of the PMMI copolymer.

The MMA proportion of the copolymer is preferably 3% to 65% by weight, preferably 4% to 60% by weight, particularly preferably 4.0% to 55% by weight, based on the total weight of the PMMI copolymer.

The proportion of MMS and MMAH is in total preferably up to 15% by weight, more preferably up to 12% by weight, particularly preferably 0.5% to 12% by weight, based on the total weight of the PMMI copolymer.

The acid number of the PMMI copolymers, determined according to DIN 53240-1:2013-06, is preferably 15 to 50 mg KOH/g, more preferably 20 to 45 mg KOH/g, yet more preferably 22 to 42 mg KOH/g.

A very particularly preferred PMMI copolymer has an MMI proportion of 36.8% by weight, an MMA proportion of 51.7% by weight and an MMS+MMAH proportion of 11.5% by weight in each case based on the total weight of the PMMI copolymer and determined by $^1$H NMR spectroscopy and an acid number of 22.5 mg KOH/g determined according to DIN 53240-1:2013-06.

An alternatively very particularly preferred PMMI copolymer has an MMI proportion of 83.1% by weight, an MMA proportion of 13.6% by weight and an MMS+MMAH proportion of 3.3% by weight in each case based on the total weight of the PMMI copolymer and determined by $^1$H NMR spectroscopy and an acid number of 22.5 mg KOH/g determined according to DIN 53240-1:2013-06.

A likewise alternatively very particularly preferred PMMI copolymer has an MMI proportion of 94.8% by weight, an MMA proportion of 4.6% by weight and an MMS+MMAH proportion of 0.6% by weight in each case based on the total weight of the PMMI copolymer and determined by H NMR spectroscopy and an acid number of 41.5 mg KOH/g determined according to DIN 53240-1:2013-06.

Suitable PMMI is available, for example, from Evonik Industries AG under the "PLEXIMID®" brand.

In the polycarbonate compositions containing oxides of metals or metalloids of the 3rd or 4th main group or 4th transition group the addition amount for the PMMI copolymer is preferably at least 1% by weight, more preferably at least 1.5% by weight, yet more preferably at least 2% by weight, yet more preferably at least 3% by weight, particularly preferably 4% by weight, very particularly preferably up to 6% by weight, in each case based on the total weight of the polycarbonate composition.

It is preferable when the ratio of component B to the PMMI copolymer is ≤40, more preferably ≤30, yet more preferably ≤25, in particular ≤20.

The glass transition temperature of the PMMI copolymer determined according to DIN EN ISO 11357-2:2014-07 at a heating rate of 20° C./min is preferably 130° C. to 170° C. The PMMI copolymer is accordingly stable under the processing conditions customary for polycarbonates including high-temperature-stable polycarbonate copolymers.

Component D

The compositions according to the invention may contain one or more further additives distinct from component B and component C which are presently summarized under "component D".

The additives are optionally (0% by weight) present in the composition according to the invention in amounts of preferably up to 20.0% by weight, more preferably up to 10.0% by weight, yet more preferably 0.10% to 8.0% by weight, particularly preferably 0.2% to 3.0% by weight, wherein these percentages by weight are based on the total weight of the composition.

Additives such as are typically added to polycarbonates are described, for example, in EP 0 839 623 A1, WO 96/15102 A2, EP 0 500 496 A1 or in "Plastics Additives Handbook", Hans Zweifel, 5th Edition 2000, Hanser Verlag, Munich. Suitable additives are in particular flame retardants, anti-drip agents, impact modifiers, fillers, antistats, organic and inorganic colourants including pigments and carbon black, lubricants and/or demoulding agents, heat stabilizers, blend partners such as ABS, polyesters, for example PET and/or PBT, or SAN, compatibilizers, UV absorbers and/or IR absorbers.

Preferred demoulding agents are esters of aliphatic long-chain carboxylic acids with mono- or polyhydric aliphatic and/or aromatic hydroxyl compounds. Particular preference is given to pentaerythritol tetrastearate, glycerol monostearate, stearyl stearate and propanediol distearate or mixtures thereof.

Preferred UV stabilizers have the lowest possible transmittance below 400 nm and the highest possible transmittance above 400 nm. Ultraviolet absorbers particularly suitable for use in the composition according to the invention are benzotriazoles, triazines, benzophenones and/or arylated cyanoacrylates.

Particularly suitable ultraviolet absorbers are hydroxybenzotriazoles such as 2-(3',5'-bis(1,1-dimethylbenzyl)-2'-hydroxyphenyl)benzotriazole (Tinuvin® 234, Ciba Spezialitatenchemie, Basle), 2-(2'-hydroxy-5'-(tert-octyl)phenyl) benzotriazole (Tinuvin® 329, Ciba Spezialitatenchemie, Basle), 2-(2'-hydroxy-3'-(2-butyl)-5'-(tert-butyl)phenyl)benzotriazole (Tinuvin® 350, Ciba Spezialitatenchemie, Basle), bis(3-(2H-benzotriazolyl)-2-hydroxy-5-tert-octyl)methane, (Tinuvin® 360, Ciba Spezialitatenchemie, Basle), (2-(4,6-diphenyl-1,3,5-triazin-2-yl)-5-(hexyloxy)phenol (Tinuvin® 1577, Ciba Spezialitatenchemie, Basle), and the benzophenones 2,4-dihydroxybenzophenone (Chimasorb® 22, Ciba Spezialitatenchemie, Basle) and 2-hydroxy-4-(octyloxy) benzophenone (Chimassorb® 81, Ciba, Basle), 2-cyano-3, 3-diphenyl-2-propenoic acid 2-ethylhexyl ester, 2,2-bis[[(2-cyano-1-oxo-3,3-diphenyl-2-propenyl)oxy]methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, Ciba Spezialitatenchemie, Basle) or tetraethyl 2,2'-(1,4-phenylenedimethylidene)bismalonate (Hostavin® B-Cap, Clariant AG).

Particularly preferred specific UV stabilizers are, for example, Tinuvin® 360, Tinuvin® 350, Tinuvin® 329, Hostavin® B-CAP, more preferably TIN 329 and Hostavin® B-Cap. It is also possible to use mixtures of these ultraviolet absorbers.

If UV absorbers are present, the composition preferably contains ultraviolet absorbers in an amount of 0 ppm to 6000 ppm, more preferably 500 ppm to 5000 ppm, yet more preferably 1000 ppm to 2000 ppm, based on the overall composition.

Suitable IR absorbers are disclosed, for example, in EP 1 559 743 A1, EP 1 865 027 A1, DE 10022037 A1, DE 10006208 A1 and in Italian patent applications RM2010A000225, RM2010A000227 and RM2010A000228. Of the IR absorbers mentioned in the literature cited, preference is given to those based on boride and tungstate, especially caesium tungstate or zinc-doped caesium tungstate, and also ITO- and ATO-based absorbers and combinations thereof.

Suitable colourants may be pigments, organic and inorganic pigments, carbon black and/or dyes. Colourants or pigments distinct from component B in the context of the present invention are sulfur-containing pigments such as cadmium red or cadmium yellow, iron cyanide-based pigments such as Prussian blue, oxide pigments such as zinc oxide, red iron oxide, black iron oxide, chromium oxide, titanium yellow, zinc/iron-based brown, titanium/cobalt-based green, cobalt blue, copper/chromium-based black and copper/iron-based black or chromium-based pigments such as chromium yellow, phthalocyanine-derived dyes such as copper phthalocyanine blue or copper phthalocyanine green, fused polycyclic dyes and pigments such as azo-based (e.g. nickel azo yellow), sulfur indigo dyes, perinone-based, perylene-based, quinacridone-derived, dioxazine-based, isoindolinone-based and quinophthalone-derived derivatives, anthraquinone-based heterocyclic systems. However, a colourant of component D in particular does not include titanium dioxide since this is captured under component B.

Specific examples of commercial products are, for example, MACROLEX® Blue RR, MACROLEX® Violet 3R, MACROLEX® Violet B (Lanxess AG, Germany), Sumiplast® Violet RR, Sumiplast® Violet B, Sumiplast® Blue OR, (Sumitomo Chemical Co., Ltd.), Diaresin® Violet D, Diaresin® Blue G, Diaresin® Blue N (Mitsubishi Chemical Corporation), Heliogen® Blue or Heliogen® Green (BASF AG, Germany). Among these, preference is given to cyanine derivatives, quinoline derivatives, anthraquinone derivatives, phthalocyanine derivatives.

Fillers other than component B may likewise be added provided that according to their nature and amount they do not impair the performance level of the present invention. These may have for example a particulate, flaky or fibrous character. Examples include chalk, barium sulfate, silicates/aluminosilicates, for example wollastonite, mica/clay phyllominerals, montmorillonite, especially also in an organophilic form modified by ion exchange, kaolin, zeolites, vermiculite, carbon fibres, magnesium hydroxide and aluminium hydroxide. It is also possible to use mixtures of different inorganic materials.

It is moreover possible to add further constituents which according to the nature of the constituent and amount thereof do not impair the performance level of the present invention.

Compositions preferred in accordance with the invention contain
A) at least 55% by weight of aromatic polycarbonate,
B) 5% to 44% by weight of one or more oxides of metals or metalloids of the 3rd main group, 4th main group and/or 4th transition group,
C) 0.1% to 8% by weight of PMMI copolymer and
D) optionally further additives.

More preferred compositions according to the invention contain
A) at least 56% by weight, preferably at least 60% by weight, of aromatic polycarbonate,
B) 10% to 35% by weight of one or more oxides of metals or metalloids of the 3rd main group, 4th main group and/or 4th transition group,
C) 0.2% to 6% by weight of PMMI copolymer and
D) optionally further additives.

Yet more preferred compositions according to the invention consist of
A) at least 60% by weight of aromatic polycarbonate,
B) 10% to 30% by weight of one or more oxides of metals or metalloids of the 3rd main group, 4th main group and/or 4th transition group,
C) 0.2% to 6% by weight of PMMI copolymer and
D) optionally one or more further additives distinct from component B and C selected from the group consisting of flame retardants, anti-drip agents, impact modifiers, fillers, antistats, colourants, pigments, carbon black, lubricants and/or demoulding agents, heat stabilizers, compatibilizers, UV absorbers and/or IR absorbers.

Particular preference is given to compositions consisting of
A) at least 68% by weight of aromatic polycarbonate,
B) up to, i.e. including, 20% by weight of one or more oxides of metals or metalloids of the 3rd main group, 4th main group and/or 4th transition group,
C) 1% by weight to 3% by weight of PMMI copolymer and
D) optionally one or more further additives distinct from component B and C selected from the group consisting of flame retardants, anti-drip agents, impact modifiers, fillers, antistats, colourants, pigments, carbon black, lubricants and/or demoulding agents, heat stabilizers, compatibilizers, UV absorbers and/or IR absorbers.

Such compositions have an excellent mechanical performance and a good heat resistance.

Very particularly preferred compositions according to the invention consist of
A) at least 68% by weight of aromatic polycarbonate,
B) 15% to 25% by weight of one or more oxides of metals or metalloids of the 3rd main group, 4th main group and/or 4th transition group,
C) 1.5% by weight to 6% by weight, especially 4% to 6% by weight, of PMMI copolymer and
D) optionally up to 10.0% by weight of one or more further additives distinct from components B and C selected from the group consisting of flame retardants, anti-drip agents, impact modifiers, fillers distinct from component B, antistats, colourants, pigments, carbon black, lubricants and/or demoulding agents, heat stabilizers, compatibilizers, UV absorbers and/or IR absorbers.

In the embodiments described as preferred it is particularly preferred when in the PMMI copolymer the proportion of methylmethacrylimide units is at least 30% by weight, the proportion of methyl methacrylate units is 3% to 65% by weight and the proportion of methylmethacrylic acid and methylmethacrylic anhydride units is in total up to 15% by weight in each case based on the total weight of the PMMI copolymer present in the composition, and the acid number, determined according to DIN 53240-1:2013-06, is 15 to 50 mg KOH/g, very particularly preferably 20 to 45 mg KOH/g.

The production of the polymer compositions according to the invention, containing the mixed components A), B), C) and optionally D) and optionally further constituents may be effected using powder premixes. It is also possible to use premixes of pellets or pellets and powders with the additives according to the invention. It is also possible to use premixes which have been produced from solutions of the mix components in suitable solvents, wherein homogenization is optionally effected in solution and the solvent is then removed. In particular the additives referred to as component D and also further constituents of the compositions according to the invention can be introduced by known methods or in the form of a masterbatch. The use of masterbatches is preferred in particular for introduction of additives and further constituents, masterbatches based on the respective polymer matrix in particular being used.

The compositions according to the invention may be extruded for example. After extrusion, the extrudate may be cooled and comminuted. The combining and commixing of a premix in the melt may also be carried out in the plasticizing unit of an injection moulding machine. In this case the melt is converted into a moulded article directly in the subsequent step.

It has been found in particular that the compositions according to the invention are particularly suitable for the production of extrudates, preferably for the extrusion of profiles and sheets.

Also possible is the use of the compositions as a housing material in the electricals/electronics sector, for instance for electricity meters, mobile electronic devices (mobile phones, laptops, tablets etc.) and likewise for TV housings, and as a material, particularly as a housing material, for domestic appliances (vacuum cleaners, air conditioning units, shavers, etc.).

Since $SiO_2$ and $Al_2O_3$ for example exhibit and introduce into the plastic article a certain thermal conductivity the heatsinks sector is a further field of application for compositions according to the invention.

The compositions according to the invention are also suitable for applications that require a high surface quality and/or a high dimensional stability, for example for printed circuit boards in the electronics sector or for reflectors. In such applications, where a low thermal coefficient of expansion is necessary, large amounts of filler are employed and good stabilization is particularly important.

In polycarbonate compositions which are required to have high reflectivities, i.e. reflective white types, titanium dioxide is employed. Such compositions find use for example in optical applications, for example as a background material for displays or fibre optics or LED systems such as in smartphones for instance. The compositions according to the invention are also suitable as a matrix material for composite production. Composites are to be understood as meaning composite materials made of a matrix material and an inorganic fibre material, in particular glass fibres, carbon fibres etc.

Stabilization using PMMI copolymer of polycarbonate compositions is preferred especially where there are high residence times, i.e. residence times of up to several minutes, i.e. in co-kneaders for example.

EXAMPLES

Polymers:
PC1: A commercially available polycarbonate based on bisphenol A having an MVR of 19 $cm^3$/10 min (300° C./1.2 kg, ISO 1133-1:2011) and a Vicat softening temperature (VST/B 120; ISO 306:2013) of 145° C. (Makrolon® 2408 from Covestro Deutschland AG). $M_w$, determined as described below, about 23 900 g/mol.

PC2: A commercially available copolycarbonate based on bisphenol A and bisphenol TMC having an MVR of 18 $cm^3$/10 min (330° C./2.16 kg, ISO 1133-1:2011) and a softening temperature (VST/B 120; ISO 306:2013) of 183° C. (Apec® 1895 from Covestro Deutschland AG). Mw, determined as described below, about 27 900 g/mol.

Stabilizers:
PMMI1: Polymethylmethacrylimide copolymer from Evonik (Pleximid® 8803) having a softening temperature (VST/B 50; ISO 306:2013) of 130° C. Acid number: 22.5 mg KOH/g, determined according to DIN 53240-1:2013-06. Proportion of MMI (methylmethacrylimide): 36.8% by weight, proportion of MMA (methyl methacrylate): 51.7% by weight, proportion of MMS (methylmethacrylic acid)+MMAH (methylmethacrylic anhydride): 11.5% by weight, in each case based on the total weight of the PMMI and determined by quantitative $^1$H-NMR spectroscopy.

PMMI2: Polymethylmethacrylimide copolymer from Evonik (Pleximid® TT50) having a softening temperature (VST/B 50; ISO 306:2013) of 150° C. Acid number: 22.5 mg KOH/g, determined according to DIN 53240-1:2013-06. Proportion of MMI: 83.1% by weight, proportion of MMA: 13.6% by weight, proportion of MMS+MMAH: 3.3% by weight, in each case based on the total weight of the PMMI and determined by quantitative $^1$H-NMR spectroscopy.

PMMI3: Polymethylmethacrylimide copolymer from Evonik (Pleximid® TT70) having a softening temperature (VST/B 50; ISO 306:2013) of 170° C. Acid number: 41.5 mg KOH/g, determined according to DIN 53240-1:2013-06. Proportion of MMI: 94.8% by weight, proportion of MMA: 4.6% by weight, proportion of MMS+MMAH: 0.6% by weight, in each case based on the total weight of the PMMI and determined by quantitative $^1$H-NMR spectroscopy.

Stab1: A maleic-anhydride-modified ethylene-propylene-1-octene terpolymer wax (ethene:propene:1-octene weight ratio 87:6:7) from Mitsui Chemical America, Inc. (Hiwax™ 1105A) having an average molecular weight (gel permeation chromatography in ortho-dichlorobenzene at 150° C. with polystyrene calibration) $M_w$=6301 g/mol, $M_n$=1159 g/mol and having an acid number of 52.6 mg KOH/g (test method JIS K0070). Maleic anhydride content: 4.4% by weight, based on the total weight of the terpolymer.

Stab2: A maleic anhydride-modified polypropylene copolymer from Honeywell (AC907P) having an average molecular weight (gel permeation chromatography in ortho-dichlorobenzene at 150° C. with polystyrene calibration) $M_w$=20 700 g/mol, $M_n$=1460 g/mol and with an acid number of 78 mg KOH/g (ASTM D-1386).

Fillers:

F1: Titanium dioxide from Kronos having a $D_{50}$=210 nm (scanning electron microscopy, ECD method; Kronos® 2230).

F2: Quartz material from Quarzwerke GmbH (50226 Frechen, Germany) obtainable under the trade name Amosil FW600 ($D_{50}$=4 μm, $D_{98}$=13 μm, unsized). This is a fired silicon dioxide having a $D_{10}/D_{90}$ ratio of about 1.5/10 determined according to ISO 13320:2009 and a specific surface area of about 6 m²/g determined according to DIN-ISO 9277:2014-01.

F3: aluminium oxide from Fluka having a pH of 7.2 measured at room temperature with a Mettler Toledo MP230 pH meter and measured according to ISO 10390:2005 in aqueous suspension.

Production Parameters:

Method A[1]:

The extruder used was a DSM Micro-Extruder MIDI 2000 having a capacity of 15 cm³. The melt temperature in the extruder was 280° C., the speed was 150 rpm and the residence time (RT) was 5 minutes or 10 minutes. A DSM injection moulding machine was used for the injection moulding. The melt temperature during injection moulding was: 300° C., the mould temperature 80° C.

Method B[1]:

The extruder used was a KraussMaffei Berstorff ZE 25 AX 40D-UTX twin-screw extruder. The melt temperature in the extruder was 300° C., the speed was 100 rpm and the throughput was 10 kg/h. The torque was 15% to 40%. Filler addition was effected via the side extruder at housing 5 (of 9).

Analytical Methods:

$M_w$: Gel permeation chromatography, calibrated against bisphenol A polycarbonate standards, using dichloromethane as eluent. Calibration with linear polycarbonates (formed from bisphenol A and phosgene) of known molar mass distribution from PSS Polymer Standards Service GmbH, Germany, calibration by method 2301-0257502-09D (2009, German language) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Injection volume; 100 μl. Detection by means of UV detector.

Yellowness Index (Y.I.) was measured according to ASTM E313-10. Transmission values (Ty) were determined according to ASTM-E-308 and reflectivity was measured according to ASTM E 1331. Both Y.I. and Ty and reflection Ry were evaluated according to D65, 10° (light type: D65/ observer: 10°). Gloss was measured according to ASTM D 523 Hunter UltraScanPRO, diffuse/8° (reference: ceramic absolute values). The colour values (L*a*b) were measured according to DIN EN ISO 11664-4:2012-06. The samples had a geometry of 6.0 mm×3.5 mm×1.5 mm.

The viscosity of the polymer melts was determined according to ISO 11443:2005 at a melt temperature of 300° C. and a shear rate of 1000 s$^{-1}$.

The Vicat softening temperature (VST/B/50) of the compositions was measured on test specimens according to ISO 306:2013.

The tensile modulus and tensile strength of the compositions were measured on test specimens according to ISO 527-1:2012.

The penetration force and penetration deformation of the compositions were measured on test specimens according to ISO 6603-2:2000.

Results:

EXAMPLES

TABLE 1

| | | 1V | 2V | 3V | 4V | 5V | 6V | 7V |
|---|---|---|---|---|---|---|---|---|
| | RT | % by wt. | % by wt. | % by wt. | % by wt. | % by wt. | % by wt. | % by wt. |
| PC1 | | 100 | 99.8 | 99.5 | 99 | 98 | 96 | 94 |
| PMMI1 | | | 0.2 | 0.5 | 1 | 2 | 4 | 6 |
| $M_w$ [g/mol] | 5 min | 23365 | 23408 | 23395 | 23409 | 23493 | 23554 | 23689 |

Filler-free polycarbonate[1] and effect of PMMI

[1]Compositions produced by method A

In unfilled polycarbonate, there is no significant degradation of the polymer chains. Therefore, no stabilizer is required. As is apparent from Table 1, the addition of PMMI to filler-free polycarbonate does not have any adverse effect on molecular weight. The average molecular weights are at a constant level within the bounds of measurement accuracy.

TABLE 2

Filler-free polycarbonate[1] and effect of PMMI

| | 8V % by wt. | 9V % by wt. | 10V % by wt. |
|---|---|---|---|
| PC1 | 99 | 99 | 99 |
| PMMI1 | 1 | | |
| PMMI2 | | 1 | |
| PMMI3 | | | 1 |
| $M_w$ [g/mol] | 23595 | 23687 | 23819 |
| Viscosity [Pa·s] | 214 | 198 | 183 |
| Vicat temperature [° C.] | 146.8 | 146.7 | 147.1 |
| Tensile modulus [MPa] | 2261 | 2212 | 2241 |
| Tensile strength [MPa] | 69.3 | 71.6 | 70 |
| Penetration, maximum force [N] | 5238 | 5218 | 5178 |
| Penetration, deformation [mm] | 19.8 | 19.5 | 19.0 |

[1]Compositions produced by method B

In unfilled polycarbonate the three employed PMMI types exhibit virtually identical characteristics. The addition of 1% by weight of PMMI copolymer has an only minimal effect on the Vicat temperature. However, the effect of the different softening temperatures of the various PMMI copolymer types is already noticeable at 1% by weight addition:

TABLE 3

Titanium dioxide-containing polycarbonate compositions[1] and effect of PMMI co-polymer

|  | RT | 11V % by wt. | 12 % by wt. | 13 % by wt. | 14 % by wt. | 15 % by wt. | 16 % by wt. | 17 % by wt. |
| --- | --- | --- | --- | --- | --- | --- | --- | --- |
| PC1 |  | 80 | 79.8 | 79.5 | 79 | 78 | 76 | 74 |
| F1 |  | 20 | 20 | 20 | 20 | 20 | 20 | 20 |
| PMMI1 |  |  | 0.2 | 0.5 | 1 | 2 | 4 | 6 |
| $M_w$ [g/mol] | 5 min | 21300 | 22300 | 22847 | 23008 | 23512 | 23490 | 23588 |
| Y.I. | 5 min | 4.52 | 4.94 | 3.60 | 4.02 | 3.99 | 3.39 | 3.94 |
| L* (D65, 10°) | 5 min | 98.0 | 97.6 | 98.5 | 98.3 | 98.2 | 98.6 | 98.5 |
| Ry (D65, 10°) [%] | 5 min | 94.99 | 93.99 | 96.18 | 95.59 | 95.35 | 96.31 | 96.07 |

[1]Compositions produced by method B

The additional 20% by weight of titanium dioxide results in a molecular weight degradation of the polycarbonate, which is significant compared to pure polycarbonate, to 21 300 g/mol. Even small amounts of PMMI copolymer of 0.2% by weight bring about a marked reduction in the molecular weight degradation. Addition of only 2% by weight of PMMI copolymer already results in attainment of a plateau range at which further PMMI addition no longer has an appreciable effect and the molecular weight of the polycarbonate remains only minimally below that of the pure polycarbonate. Even after a residence time of 5 minutes the molecular weight is approximately at the level of the unfilled polycarbonate.

In terms of yellowing (Y.I.) no significant difference within the concentration range (0% to 6% by weight of PMMI copolymer) is apparent; if anything the trend appears to be one of minimal reduction in yellowing. Compared to the unstabilized composition (example 11V) the L-value is unchanged and the reflectivity Ry of titanium dioxide-filled polycarbonate is not affected by the addition of PMMI copolymer either.

TABLE 4

Titanium dioxide-containing polycarbonate compositions[1] and effect of different PMMI types

|  | RT | 18V % by wt. | 19 % by wt. | 20 % by wt. | 21 % by wt. |
| --- | --- | --- | --- | --- | --- |
| PC1 |  | 80 | 79 | 79 | 79 |
| F1 |  | 20 | 20 | 20 | 20 |
| PMMI1 |  |  | 1 |  |  |
| PMMI2 |  |  |  | 1 |  |
| PMMI3 |  |  |  |  | 1 |
| $M_w$ [g/mol] | 5 min | 21300 | 23008 | 23024 | 22801 |
| Y.I. (D65, 10°) | 5 min | 4.52 | 4.02 | 4.03 | 3.88 |

[1]Compositions produced by method A

The employed PMMI copolymer types differ in their content of MMI, MMA, acid and anhydride. No relevant difference in the stabilization of titanium dioxide-filled polycarbonate compositions is detectable between the different PMMI copolymers. Each of the three PMMI copolymers brings about good stabilization. In terms of yellowing too, no significant difference is detectable. Compared to the non-additized polycarbonate composition (example 18V) the addition of PMMI copolymer brings about a slight reduction in the Y.I. value and thus an improvement in yellowing.

TABLE 5

Comparison of different acid/maleic anhydride-functionalized copolymers as stabilizers[1]

|  | RT | 22V % by wt. | 23V % by wt. | 24V % by wt. | 25 % by wt. | 26V % by wt. | 27V % by wt. |
| --- | --- | --- | --- | --- | --- | --- | --- |
| PC1 |  | 99 | 99 | 99 | 79 | 79 | 79 |
| F1 |  |  |  |  | 20 | 20 | 20 |
| PMMI1 |  | 1 |  |  | 1 |  |  |
| Stab1 |  |  | 1 |  |  | 1 |  |
| Stab 2 |  |  |  | 1 |  |  | 1 |
| $M_w$ [g/mol] | 5 min | 23409 | 23382 | 23104 | 23008 | 23662 | 23431 |
| Y.I. (D65, 10°) | 5 min | 12.75 | 22.98 | 16.55 | 4.02 | 2.98 | 3.74 |
| Ty (%) | 5 min | 80.9 | 61.8 | 48.3 | — | — | — |

[1]Compositions produced by method A

In combination with titanium dioxide as a filler, PMMI1, Stab 1 and Stab 2 bring about an approximately equally effective stabilization of the polycarbonate.

In unfilled polycarbonate (Examples 22V to 24V), compared to polycarbonate comprising the stabilizers Stab1 and Stab 2, addition of PMMI copolymer results in a Y.I. value that is markedly reduced, i.e. the yellowing is lower. Compared to the PMMI copolymer Stab1 and Stab 2 bring about more severe clouding, detectable by the reduction in the transmission to 61%/48%.

TABLE 6

Comparison of different filler/additive ratios[1]

| RT | 28 % by wt. | 29 % by wt. | 30 % by wt. | 31V % by wt. | 32 % by wt. | 33 % by wt. | 34 % by wt. |
|---|---|---|---|---|---|---|---|
| PC1 | 89.5 | 89 | 88 | 80 | 79.8 | 79.5 | 79 |
| F1 | 10 | 10 | 10 | 20 | 20 | 20 | 20 |
| PMMI1 | 0.5 | 1 | 2 | 0 | 0.2 | 0.5 | 1 |
| F1/PMMI1 | 20 | 10 | 5 | 0 | 100 | 40 | 20 |
| $M_w$ [g/mol] 5 min | 22973 | 22994 | 22973 | 21300 | 22300 | 22847 | 23008 |

| | RT | 35 % by wt. | 36 % by wt. | 37 % by wt. | 38 % by wt. | 39 % by wt. | 40 % by wt. |
|---|---|---|---|---|---|---|---|
| PC1 | | 78 | 76 | 74 | 68.5 | 67 | 66 |
| F1/PMMI1 | | 20 | 20 | 20 | 30 | 30 | 30 |
| PMMI1 | | 2 | 4 | 6 | 1.5 | 3 | 4 |
| F1/PMMI1 | | 10 | 5 | 3.3 | 20 | 10 | 7.5 |
| $M_w$ [g/mol] | 5 min | 23512 | 23490 | 23588 | 22967 | 22855 | 22905 |

[1]Compositions produced by method A

Titanium dioxide-filled PC has a maximum achievable stabilization limit at 10% to 30% by weight of filler. This is approximately between 23000-23500 g/mol. The molecular weight no longer changes significantly above about 0.5% by weight of PMMI copolymer.

TABLE 7

Stabilization of titanium dioxide-filled (co)polycarbonate compositions[1] with various PMMI copolymer types and waxes.

| | 41V % by wt. | 42 % by wt. | 43 % by wt. | 44 % by wt. | 45 % by wt. | 46V % by wt. | 47V % by wt. | 48V % by wt. | 49V % by wt. |
|---|---|---|---|---|---|---|---|---|---|
| PC1 | 80 | 79.5 | 79 | 78 | 77 | 79 | 78 | 79 | 78 |
| PC2 | | | | | | | | | |
| F1 | 20 | 20 | 20 | 20 | 20 | 20 | 20 | 20 | 20 |
| PMMI1 | | 0.5 | 1 | 2 | 3 | | | | |
| PMMI2 | | | | | | | | | |
| PMMI3 | | | | | | | | | |
| Stab1 | | | | | | 1 | 2 | | |
| Stab2 | | | | | | | | 1 | 2 |
| F1/Stab. | 0 | 40 | 20 | 10 | 6.7 | 20 | 10 | 20 | 10 |
| Viscosity [Pa·s] | 147 | 225 | 231 | 209 | 250 | 202 | 182 | 173 | 149 |
| Vicat temperature [°C.] | 144.3 | 146.7 | 146.7 | 146.4 | 146.4 | 144.3 | 143.1 | 145.6 | 144.9 |
| Tensile modulus [MPa] | 2694 | 2694 | 2717 | 2714 | 2764 | 2604 | 2465 | 2685 | 2697 |
| Tensile strength [MPa] | 57.6 | 60.7 | 60.8 | 61.6 | 61.8 | 52.9 | 52.1 | 53.4 | 53.8 |
| Elongation at break [%] | 33.4 | 63.1 | 52.8 | 68.6 | 63.2 | 71.5 | 82.1 | 53.9 | 66.7 |
| Penetration, maximum force [N] | 4128 | 4467 | 4527 | 4600 | 4653 | 4124 | 3865 | 4099 | 3965 |
| Penetration, deformation [mm] | 13.8 | 14.1 | 14.0 | 13.9 | 14.0 | 14.6 | 13.9 | 14.0 | 13.6 |
| $M_w$ [g/mol] | 22164 | 23386 | 23503 | 23589 | 23560 | 23575 | 23580 | 23463 | 23399 |

| | 50 % by wt. | 51 % by wt. | 52 % by wt. | 53 % by wt. | 54V % by wt. | 55 % by wt. | 56 % by wt. | 57 % by wt. |
|---|---|---|---|---|---|---|---|---|
| PC1 | 89 | 67 | 79 | 79 | | | | |
| PC2 | | | | | 80 | 79 | 79 | 79 |
| F1 | 10 | 30 | 20 | 20 | 20 | 20 | 20 | 20 |
| PMMI1 | 1 | 3 | | | | 1 | | |
| PMMI2 | | | 1 | | | | 1 | |
| PMMI3 | | | | 1 | | | | 1 |
| Stab1 | | | | | | | | |
| Stab2 | | | | | | | | |

TABLE 7-continued

Stabilization of titanium dioxide-filled (co)polycarbonate compositions[1] with various PMMI copolymer types and waxes.

| F1/Stab. | 10 | 10 | 20 | 20 | 0 | 20 | 20 | 20 |
|---|---|---|---|---|---|---|---|---|
| Viscosity [Pa · s] | 229 | 242 | 256 | 230 | 202 | 301 | 301 | 269 |
| Vicat temperature [° C.] | 146.5 | 146.0 | 146.9 | 146.6 | 179.1 | 180.1 | 179.9 | 179.8 |
| Tensile modulus [MPa] | 2470 | 3105 | 2676 | 2726 | 2779 | 2767 | 2782 | 2767 |
| Tensile strength [MPa] | 60.8 | 62.4 | 59.9 | 59.8 | 68.1 | 69.7 | 70 | 70 |
| Elongation at break [%] | 99.9 | 12.4 | 23.8 | 28.7 | 9.6 | 13.8 | 11.2 | 14.5 |
| Penetration, maximum force [N] | 4798 | 3972 | 4369 | 4275 | 3293 | 4267 | 3000 | 2734 |
| Penetration, deformation [mm] | 15.7 | 11.1 | 13.8 | 13.5 | 9.7 | 11.9 | 8.8 | 8.3 |
| $M_w$ [g/mol] | 23607 | 23466 | 23500 | 23343 | 25398 | 27034 | 26468 | 26296 |

[1]Compositions produced by method B

The PMMI copolymer types 2 and 3 result in a markedly poorer elongation at break, i.e. toughness, in bisphenol A-based polycarbonate than the PMMI copolymer I (cf. examples 52, 53 with 43) which is, however, nevertheless in a good range. For polycarbonate copolymer PC-2 as the base material, no appreciable difference in terms of elongation at break is detectable between the employed PMMI copolymer types (examples 55 to 57). However, even at 1% by weight of PMMI copolymer a marked effect on molecular weight stabilization is detectable and is likely to be even more pronounced for greater amounts of PMMI copolymer. Compared to a non-additized composition (Ex. 54V) the addition of only 1% by weight of PMMI1 brings about markedly improved impact characteristics and an increased elongation at break also for PC-2 (Ex. 55). For PC-2 all three PMMI copolymer types increase toughness while strength/stiffness remain unchanged (cf. Ex. 54 V with Ex. 55-57).

Stabilization with Stab1 and Stab2 in identical amounts (1% or 2% by weight) as for PMMI copolymer 1 for comparison has a comparable effect on reducing molecular weight degradation. However, the compositions containing the polyolefin systems Stab1/Stab2 show a relevant reduction in the Vicat temperature. In addition, the mechanical properties are altogether poorer compared to a composition comprising PMMI copolymer; the tensile modulus and tensile strength are reduced. Addition of Stab1 und Stab2 further results in significantly poorer impact characteristics (measured by a achievable maximum force in penetration test) than for addition of PMMI1 (Ex. 46V-49V compared to Ex. 43, 44).

TABLE 8

Fired silicon dioxide-containing polycarbonate compositions[1] and effect of PMMI copolymer

| | | 58V % by wt | 59 % by wt | 60 % by wt | 61 % by wt | 62 % by wt. | 63 % by wt | 64 % by wt |
|---|---|---|---|---|---|---|---|---|
| PC1 | | 80 | 79.8 | 79.5 | 79 | 78 | 76 | 74 |
| F2 | | 20 | 20 | 20 | 20 | 20 | 20 | 20 |
| PMMI1 | | | 0.2 | 0.5 | 1 | 2 | 4 | 6 |
| | RT | | | | | | | |
| $M_w$ [g/mol] | 5 min | 22299 | | not tested | | 23388 | 23556 | 23581 |
| $M_w$ [g/mol] | 10 min | 21424 | | | | 23582 | 23513 | 23523 |

[1]Compositions produced by method A

Compared to other inorganic fillers the fired silicon dioxide used here has a better compatibility with polycarbonate as is apparent from the lower molecular weight degradation of only about 1000 g/mol without additional stabilizer. The slightly acidic character of the silicon dioxide has a less pronounced incompatibility with polycarbonate. However, here too a stabilizing effect can still be achieved by addition of PMMI copolymer, a plateau range being achieved no later than about 2% by weight. Higher concentrations of 4-6% result in no further improvement.

Particularly at a higher residence time of 10 minutes this stabilization is still effective and the molecular weight is at the level of unfilled PC. While without PMMI copolymer the molecular weight is reduced by a further 1000 g/mol (example 58V) the molecular weights of the additized compounds (examples 62-64) remain unchanged.

TABLE 9

Measurement of material properties on stabilized compounds[1]

| | 65 | 66 | 67 | 68V | 69 | 70 | 71 | 72 | 73 | 74V |
|---|---|---|---|---|---|---|---|---|---|---|
| | | | | | % by wt. | | | | | |
| PC1 | 89.5 | 89 | 88 | 80 | 79.8 | 79.5 | 79 | 78 | 77 | 79 |
| F2 | 10 | 10 | 10 | 20 | 20 | 20 | 20 | 20 | 20 | 20 |
| PMMI1 | 0.5 | 1 | 2 | | 0.2 | 0.5 | 1 | 2 | 3 | |
| Stab1 | | | | | | | | | | |
| Stab2 | | | | | | | | | | 1 |
| Ratio F2/Stab | 20 | 10 | 5 | 0 | 100 | 40 | 20 | 10 | 6.7 | 20 |
| Viscosity [Pa · s] | 198 | 262 | 244 | 213 | 297 | 306 | 304 | 309 | 297 | 197 |
| Vicat temperature [° C.] | 147.4 | 147.2 | 147 | 146.7 | 148 | 148.1 | 148 | 148.1 | 147.4 | 145.4 |
| Tensile modulus [MPa] | 2619 | 2639 | 2696 | 3179 | 3138 | 3195 | 3159 | 3212 | 3198 | 3031 |
| Tensile strength [MPa] | 60.5 | 61 | 61.3 | 61.9 | 61.4 | 62.4 | 62.6 | 63.1 | 63.2 | 51.2 |
| Elongation at break [%] | 83 | 95.2 | 84 | 11.4 | 16 | 17.1 | 20.5 | 18.8 | 27 | 23 |
| Penetration, maximum force [N] | 4664 | 4723 | 4806 | 3429 | 3383 | 3420 | 3988 | 3842 | 3811 | 3671 |
| Penetration, deformation [mm] | 14.4 | 14.5 | 14.9 | 9.5 | 9.9 | 10.2 | 10.9 | 10.5 | 10.3 | 11.9 |
| $M_w$ [g/mol] | 23652 | 23722 | 23807 | 22623 | 23376 | 23659 | 23825 | 23834 | 23808 | 23491 |

| | 75V | 76V | 77V | 78 | 79 | 80 | 81 | 82 |
|---|---|---|---|---|---|---|---|---|
| | | | | % by wt. | | | | |
| PC1 | 78 | 79 | 78 | 68.5 | 67 | 66 | 58 | 56 |
| F2 | 20 | 20 | 20 | 30 | 30 | 30 | 40 | 40 |
| PMMI1 | | | | 1.5 | 3 | 4 | 2 | 4 |
| Stab1 | 2 | | | | | | | |
| Stab2 | | 1 | 2 | | | | | |
| Ratio F2/Stab | 10 | 20 | 10 | 20 | 10 | 7.5 | 20 | 10 |
| Viscosity [Pa · s] | —[2] | 196 | 121 | 376 | 374 | 362 | 503 | 474 |
| Vicat temperature [° C.] | 144.3 | 146.7 | 146.2 | 149.1 | 148.4 | 148.3 | 149.6 | 149.2 |
| Tensile modulus [MPa] | 2975 | 3151 | 3216 | 3825 | 3917 | 3902 | 4747 | 4802 |
| Tensile strength [MPa] | 45.9 | 49.2 | 45.6 | 65 | 65.4 | 65.8 | 68.1 | 69.1 |
| Elongation at break [%] | 16 | 31.3 | 36.4 | 14.2 | 14.4 | 10.9 | 5 | 4.8 |
| Penetration, maximum force [N] | 1535 | 3664 | 3382 | 852 | 666 | 780 | 533 | 457 |
| Penetration, deformation [mm] | 7.9 | 12.5 | 12.2 | 4.4 | 3.7 | 4 | 4.8 | 4.6 |
| $M_w$ [g/mol] | 23683 | 23512 | 23597 | 23749 | 23763 | 23814 | 23746 | 23829 |

[1]Compositions produced by method B;
[2]Sample too runny

Upon addition of the wax Stab1 the tensile modulus is slightly reduced (examples 74V, 75V) compared to compositions to which PMMI copolymer has been added (examples 71, 72). Tensile strength remains approximately constant upon addition of PMMI copolymer or increases slightly (examples 69 to 73), while markedly decreasing upon addition of Stab or Stab2. While the filler per se initially has a reinforcing effect this is partially lost again as a result of Stab1 or Stab2 despite these having a stabilizing effect; Stab1 and Stab2 have a plasticizing effect. The Vicat temperature is also significantly reduced (Ex. 71, 72 with 74V-77V). The PMMI copolymer also brings about a slightly better stabilization compared to Stab1 and Stab2 (Ex. 71, 72 with 74V-77V). After an addition amount of about 1% by weight a plateau range is attained.

The compositions containing 10% by weight of fired silicon dioxide and PMMI copolymer (examples 65 to 67) exhibit very high elongation at break values.

TABLE 10

Fired silicon dioxide-containing polycarbonate compositions[1] and effect of different PMMI types

| | 83 | 84 | 85 |
|---|---|---|---|
| | | % by wt. | |
| PC1 | 79 | 79 | 79 |
| F2 | 20 | 20 | 20 |
| PMMI1 | 1 | | |
| PMMI2 | | 1 | |
| PMMI3 | | | 1 |

TABLE 10-continued

Fired silicon dioxide-containing polycarbonate compositions[1] and effect of different PMMI types

|  | 83 | 84 | 85 |
|---|---|---|---|
|  |  | % by wt. |  |
| Viscosity [Pa · s] | 304 | 291 | 294 |
| Vicat temperature [° C.] | 148 | 148.3 | 148.2 |
| Tensile modulus [MPa] | 3159 | 3207 | 3202 |
| Tensile strength [MPa] | 62.6 | 62.7 | 62.4 |
| Penetration, maximum force [N] | 3988 | 4013 | 3690 |
| Penetration, deformation [mm] | 10.9 | 11 | 10.4 |
| Mw (g/mol) | 23 825 | 23 436 | 23 253 |

[1]Compositions produced by method B

Examples 83 to 85 show that in silicon dioxide-containing compositions the PMMI copolymer having the lowest imide proportion (PMMI1) has the strongest stabilizing effect against molecular weight degradation. PMMI2 achieves the best mechanics (tensile, penetration) and the best Vicat temperature coupled with the best flowability, i.e. lowest viscosity.

TABLE 11

Aluminium oxide-filled compositions[1] and effect of PMMI copolymer

|  | RT | 86V % by wt. | 87 % by wt. |
|---|---|---|---|
| PC1 |  | 90 | 89 |
| F3 |  | 10 | 10 |
| PMMI1 |  |  | 1 |
| $M_w$ | 5 | 15 844 | 19 321 |

[1]Compositions produced by method A

The degradation caused by 10% by weight of $Al_2O_3$ at a residence time of 5 min is already very pronounced but can be markedly reduced using only 1% PMMI copolymer.

The invention claimed is:

1. A composition containing
   A) aromatic polycarbonate,
   B) one or more oxides of metals or metalloids of the 3rd main group, 4th main group and/or 4th transition group, wherein the proportion of oxides of metals or metalloids of the 3rd main group, 4th main group and/or 4th transition group is 15% to 25% by weight based on the total composition and the ratio of oxides of metals or metalloids of the 3rd main group, 4th main group and/or 4th transition group to PMMI copolymer is ≤40,
   C) PMMI copolymer and
   D) optionally further additives.
2. The composition according to claim 1, wherein the composition contains
   A) at least 55% by weight of aromatic polycarbonate,
   B) 5% to 44% by weight of one or more oxides of metals or metalloids of the 3rd main group, 4th main group and/or 4th transition group,
   C) 0.1% to 8% by weight of PMMI copolymer and
   D) optionally further additives.
3. The composition according to claim 1, wherein the composition contains
   A) at least 56% by weight of aromatic polycarbonate,
   B) 10% to 35% by weight of one or more oxides of metals or metalloids of the 3rd main group, 4th main group and/or 4th transition group,
   C) 0.2% to 6% by weight of PMMI copolymer and
   D) optionally further additives.
4. The composition according to claim 1, consisting of
   A) at least 60% by weight of aromatic polycarbonate,
   B) 10% to 30% by weight of one or more oxides of metals or metalloids of the 3rd or 4th main group or 4th transition group,
   C) 0.2% to 6% by weight of PMMI copolymer and
   D) optionally one or more further additives distinct from components B and C selected from the group consisting of flame retardants, anti-drip agents, impact modifiers, fillers, antistats, colourants, pigments, carbon black, lubricants and/or demoulding agents, heat stabilizers, blend partners, compatibilizers, UV absorbers and/or IR absorbers.
5. The composition according to claim 1, wherein the composition contains at least 1.5% by weight of PMMI copolymer, based on the overall composition.
6. The composition according to claim 1, wherein the composition contains at least 1.0% by weight of PMMI copolymer.
7. The composition according to claim 1, wherein the PMMI copolymer has methyl methacrylate units, methylmethacrylimide units, methylmethacrylic acid units and methylmethacrylic anhydride units.
8. The composition according to claim 1, wherein the proportion of methylmethacrylimide units is at least 30% by weight, the proportion of methyl methacrylate units is 3% to 65% by weight and the proportion of methylmethacrylic acid and methylmethacrylic anhydride units is in total up to 15% by weight in each case based on the total weight of the PMMI copolymer present in the composition.
9. The composition according to claim 1, wherein the acid number of the PMMI copolymer, determined according to DIN 53240-1:2013-06, is 15 to 50 mg KOH/g.
10. The composition according to claim 1, wherein the proportion of PMMI copolymer in the composition is 2% to 6% by weight.
11. A moulding made from or comprising regions of a composition according to claim 1.
12. The moulding according to claim 11 wherein the moulding is selected from the group consisting of a profile, a plate, a housing part in the electricals/electronics sector, a heatsink, a reflector, a printed circuit board in the electronics sector, an element for an optical application, and a composite.
13. A method comprising providing a polycarbonate composition comprising at least one PMMI copolymer and one or more oxides of metals or metalloids of the 3rd main group, 4th main group and/or 4th transition group during compounding, wherein the proportion of oxides of metals or metalloids of the 3rd main group, 4th main group and/or 4th transition group is 15% to 25% by weight based on the total composition and the ratio of oxides of metals or metalloids of the 3rd main group, 4th main group and/or 4th transition group to PMMI copolymer is ≤40, and reducing the molecular weight degradation of aromatic polycarbonate in the composition.
14. The method according to claim 13, wherein the PMMI copolymer has 3% to 65% by weight of methyl methacrylate units, at least 30% by weight of methylmethacrylimide units, a total of up to 15% by weight of methylmethacrylic acid units and methylmethacrylic anhydride units, in each case based on the total weight of the PMMI copolymer, and an acid number, determined according to DIN 53240-1:2013-06, of 15 to 50 mg KOH/g.

* * * * *